M. E. HENDERSON.
ATTACHMENT FOR EVAPORATING KETTLES.
APPLICATION FILED MAR. 26, 1920.

1,431,523.

Patented Oct. 10, 1922.

Inventor
M. E. HENDERSON

By W. J. FitzGerald
Attorney

Patented Oct. 10, 1922.

1,431,523

UNITED STATES PATENT OFFICE.

MARTIN E. HENDERSON, OF MANOR, GEORGIA.

ATTACHMENT FOR EVAPORATING KETTLES.

Application filed March 26, 1920. Serial No. 369,125.

*To all whom it may concern:*

Be it known that I, MARTIN E. HENDERSON, a citizen of the United States, residing at Manor, in the county of Ware and State of Georgia, have invented certain new and useful Improvements in Attachments for Evaporating Kettles; and I do hereby declare the following to be a full, clear, and exact description of the invention, such as will enable others skilled in the art to which it appertains to make and use the same.

The present invention relates to evaporators for boiling down sap or juices, and has for its object the provision of a novel and improved kettle attachment, for the purpose of increasing the capacity of the kettle and facilitating the removal of the scum and foreign matter from the juice as it boils.

A further object is the provision of such an attachment of novel form and constructed for attachment to the rim of the kettle or vat.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1:
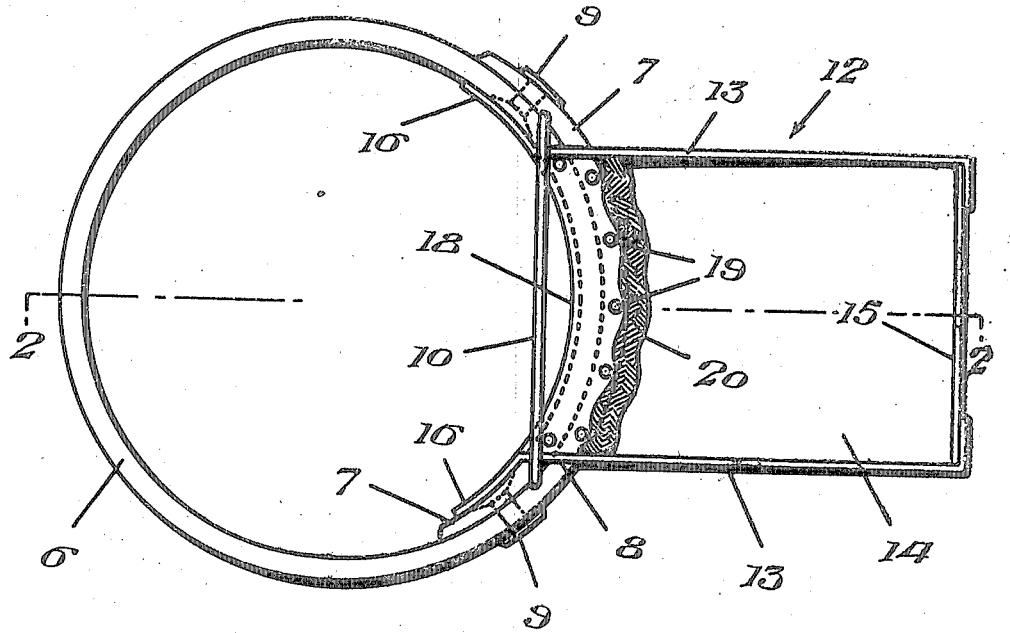
Figure 1 is a plan view of the evaporator.

The evaporating kettle or vat is indicated at K, and fitted on the rim thereof is an annular rim member 6, having a vertical wall. This member 6 is formed from a length of wood or other equivalent material which is bent into circular form, with the terminal portions 7 overlapping through an arc of about one third of the circumference of the member 6. The overlapping portions 7 are provided with an upwardly opening recess or opening 8, and said portions 7 are secured together at the opposite sides of said opening 8, by means of rivets 9 or the like. In order to strengthen the member 6 at the opening, a brace rod 10 extends over the opening and has downwardly bent terminals 11 driven between the portions 7 at the opposite sides of the opening, thereby strengthening the upper edge portion of the member 6 where it is weakened by the opening 8.

A skimming and cooling trough 12 extends radially from the member 6, being constructed of sheet metal or similar material and having the side walls 13, inclined bottom 14, and the outer closed end 15. The inner open portion of the trough 12 is fitted within the opening 8, with the side walls 13 extending across the side edges of the opening 8 and provided with extensions or flanges 16 bent to overlap the member 6 on the inside, and said extensions 16 are secured to the member 6 by means of nails 17 or other securing elements. The bottom 14 extends across the lower edge of the opening 8 and has a downturned lip or flanges 18 overlapping the member 6 on the inside below the opening whereby the sap or juice which drains back from the trough will be directed back into the kettle.

A strainer is located within the inner open end of the trough, and for this purpose, a row of pins 19 are driven downwardly through the bottom 12 into the portions 7 below the opening 8, for retaining in place a strainer 20 placed on the bottom 14 of the trough against said pins. The strainer 20 may be made of a folded sack, sheet of fabric, or porous material with the strainer on the bottom of the trough extending from one side thereof to the other, at the inner open end.

Figure 2:
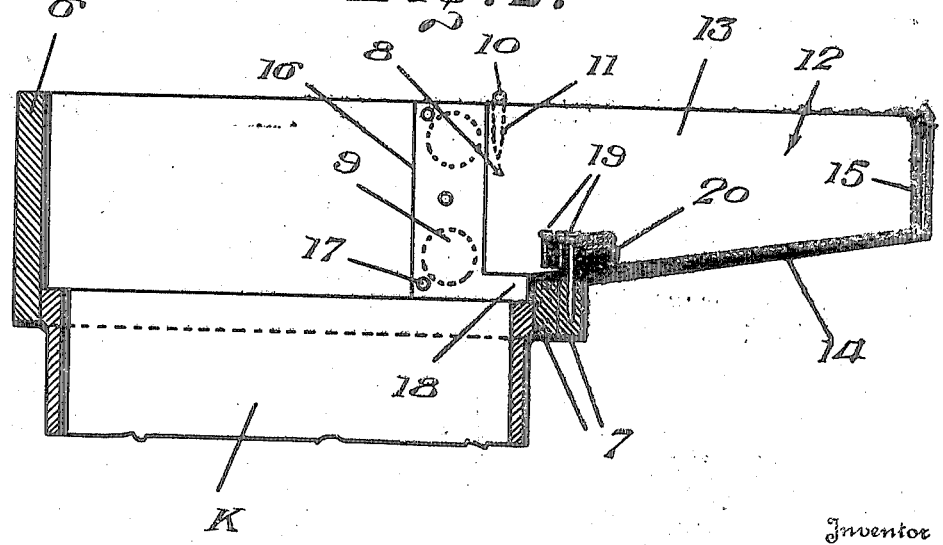
Fig. 2 is a section on the line 2—2 of Fig. 1.

The member 6 can be readily applied to the rim of the kettle, as seen in Fig. 2, and said member with the trough 12 will considerably increase the capacity of the kettle especially in view of the fact that the kettle can be filled up to the edge, and the member 6 and spout 12 will retain the foam as the juice or sap boils. As the juice or sap boils, it rises, and the foam will flow over into the trough 12 over the strainer 20, and in coming into contact with the metal, which is kept cool by the air, the foam will condense, and the condensed juice will flow back down the sloping bottom 14 of the trough, and pass through the strainer 20. This strainer will catch the scum and foreign matter, which can be readily skimmed out with a spoon or other instrument. This boiling over of the foam into the trough is practically continuous during the boiling of the juice or sap, providing a continuous straining of the foam, and thereby enabling the scum and foreign matter to be conveniently removed. The trough 12 being of sheet metal and extending to one side from the kettle, will be cooled by the air, to condense the foam as it flows over the strainer into the trough, thereby keeping up the circulation through the strainer. This saves considerable time and trouble in removing the skimmings, and results in a higher grade of syrup with much less manual effort, as well as increasing the output.

Having thus described the invention, what is claimed as new is:—

1. An attachment for an evaporating kettle comprising an annular rim member to fit the rim of the kettle having an opening at one side, and a cooling and skimming trough extending to one side from the rim member and fitted and secured within said opening.

2. An attachment for an evaporating kettle comprising an annular rim member to fit the rim of the kettle having an opening at one side, a cooling and skimming trough extending to one side from the rim member and fitted and secured within said opening, the bottom of the trough being inclined to drain the sap or juice back into the kettle, and a strainer within said trough at the inner end thereof.

3. An attachment for an evaporating kettle comprising an annular rim member to fit the rim of the kettle having an opening at one side, and a cooling and skimming trough extending from said side of the rim and having its inner end portion fitted within said opening and provided with flanges overlapping the rim member on the interior thereof.

4. An attachment for an evaporating kettle comprising an annular rim member to fit the rim of the kettle having an opening at one side, a cooling and skimming trough extending from said side of the rim member and having its inner end fitted in said opening, and pins driven downwardly into the rim member at the inner end of said trough for retaining a strainer in the trough.

5. An attachment for an evaporating kettle comprising an annular rim member to fit the rim of the kettle having an opening at one side, a cooling and skimming trough extending from said side of the rim member and fitted and secured within said opening, and a brace rod extending across said opening and inner end of the trough and secured to the rim member at the opposite sides of said opening.

6. An attachment for an evaporating kettle comprising an annular rim member to fit the rim of the kettle comprising a length of material having overlapping terminal portions, said overlapping terminal portions having an opening, and a cooling and skimming trough extending from the rim member and having its inner end portion fitted and secured within said opening.

In testimony whereof I have signed my name to this specification in the presence of two subscribing witnesses.

MARTIN E. HENDERSON.

Witnesses:
L. H. HERRIN,
CARY BEVEREG.